United States Patent [19]

Rice

[11] Patent Number: 4,744,926

[45] Date of Patent: May 17, 1988

[54] MASS TRANSFER EXTRACTION OF LIQUIDS FROM SOLIDS

[75] Inventor: Wayne K. Rice, Wanatah, Ind.

[73] Assignee: Vitamins, Inc., Chicago, Ill.

[21] Appl. No.: 18,404

[22] Filed: Feb. 25, 1987

Related U.S. Application Data

[63] Continuation of Ser. No. 774,332, Sep. 10, 1985, abandoned.

[51] Int. Cl.$^4$ .......................... C11B 1/06; C11B 1/10
[52] U.S. Cl. ............................... 260/412.2; 260/412; 260/412.4; 203/49; 426/601
[58] Field of Search ................... 260/412.2, 412, 412.4; 203/49; 426/601

[56] References Cited

U.S. PATENT DOCUMENTS 4,466,923 8/1984 Friedrich ..................... 260/412.4

OTHER PUBLICATIONS

Gaehrs et al, Chemical Abstract 100: 105629y, *Chem. Tech.* (Heidelberg), 1983, (11), pp. 19-21.

*Primary Examiner*—Charles F. Warren
*Assistant Examiner*—Elizabeth A. Hanley
*Attorney, Agent, or Firm*—Donald E. Egan

[57] ABSTRACT

An extraction process comprises contacting a material to be extracted with an extracting fluid at elevated pressure within a defined space, and separating the extracting fluid and extract, as a mass, from the extracted material while reducing the volume of the defined space and while maintaining the elevated pressure within the defined space. Apparatus for carrying out the process is adapted to separate the extracting fluid and the extract, as a mass, from the extracted material, while maintaining elevated pressure and reducing the volume at the point of separation.

9 Claims, 4 Drawing Sheets

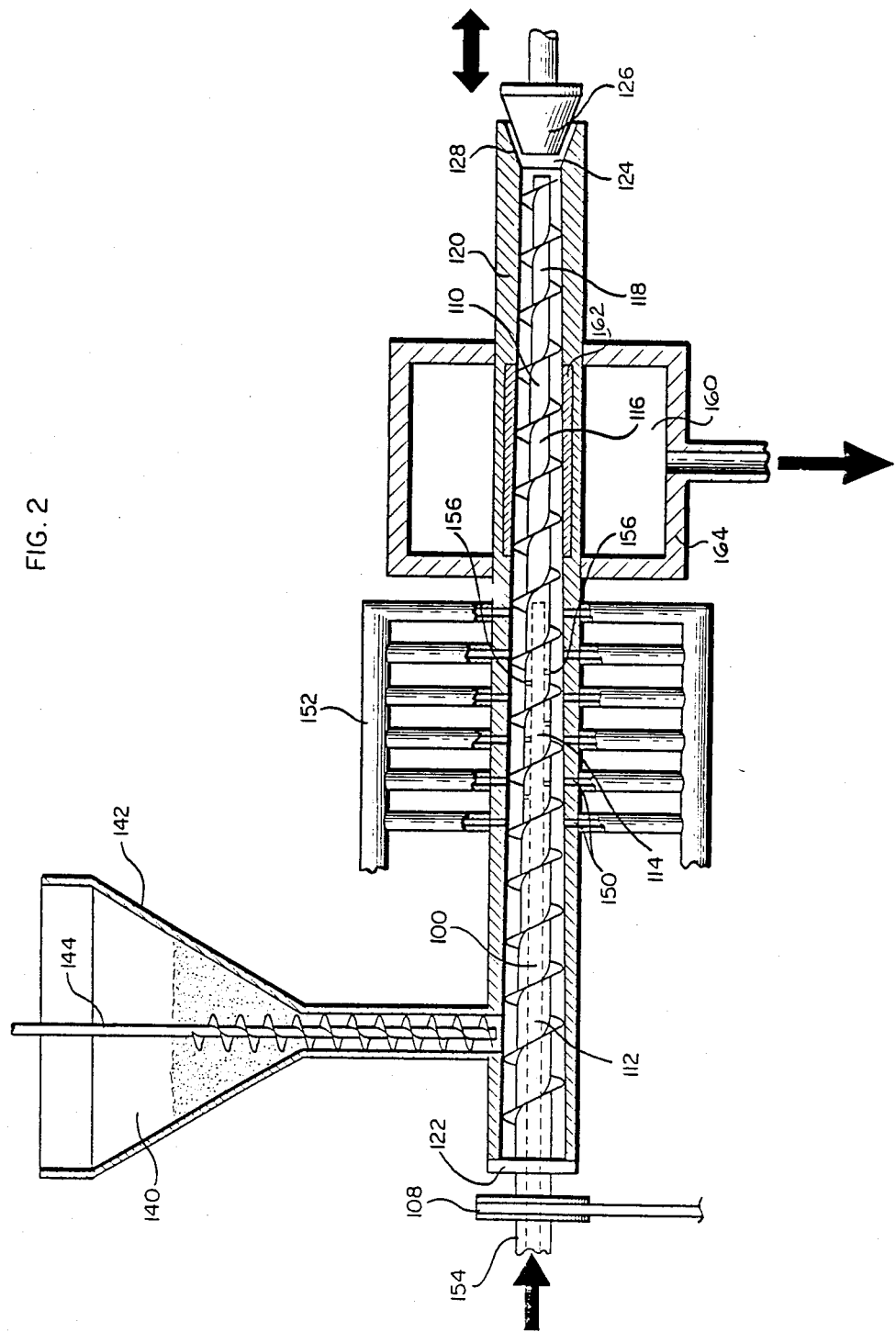

MASS TRANSFER EXTRACTION OF LIQUIDS FROM SOLIDS

This is a continuation of application Ser. No. 774,332 filed Sept. 10, 1985, now abandoned.

The present invention broadly relates to processes for extracting liquid materials from solids, wherein the solids are contacted with an extracting fluid at elevated pressure, and a mass transfer is effected to separate the liquid extract and the extracting fluid from the solids while the elevated pressure is maintained. Preferably, the mass transfer is effected with physical compaction of the solids. It is generally preferred that the extracting fluid be gaseous at the normal pressure and temperature. The present invention also relates to apparatus for carrying out such processes and specifically contemplates a variable volume extraction vessel and a screw press for use in such extractions.

The present invention broadly provides a process and apparatus having maximum flexibility as to time, temperature and pressure conditions applied to extract a wide variety of raw materials and, using a wide variety of extraction solvents, produce maximum yields of the product which may be either the extract or the extracted product, without the need to modify the equipment.

BACKGROUND OF INVENTION

The use of liquified gases and supercritical fluids to carry out extractions at high elevated pressure has been described in the prior art. Such prior art processes involve the use of liquified gases or supercritical fluids at pressures in excess of 3,000 to 5,000 psi, although in some cases the recommended pressures exceed 10,000 psi.

Processes for extractions run at extremely high pressures are described in the following U.S. Pat. Nos. 4,156,688; 4,328,255; 4,466,923; 4,493,854; 4,495,207; and in Applicant's co-pending application Ser. No. 732,362 filed May 8, 1985.

Generally speaking, these prior art processes separate the extracted material from the residual solids by an elution or dilution process, wherein the supercritical fluids are pumped through the material to be extracted over a period of time, and as the extracting fluid is pumped through the solids, the level of extractable liquid in the solids is gradually reduced.

SUMMARY OF THE INVENTION

The present invention is based on the discovery that liquids may be advantageously extracted from solids by contacting the solid material to be extracted with selected extracting fluids at elevated pressure, and separating the fluids (i.e., the extracting fluid and the extracted liquid) in mass from the solids while maintaining the elevated pressure, without the need to continuously pump additional extracting fluid through the material being extracted. Preferably, the mass transfer of the fluids from the solids is accomplished while compacting the solids.

In the first essential step, the extracting fluid as brought into contact with the material to be extracted at an increased pressure level. The pressure and temperature are selected to provide the desired extraction and separation of the materials involved. In the second essential step, the extracting fluid and the entrained or dissolved liquid extract are separated from the solid residue in mass while the pressure on the system is maintained at the selected level. Preferably, the extracted solid material is compacted, while maintaining the elevated pressure, in order to expel additional extracting fluid and extract.

In the process of the present invention, the extracting fluid is preferably a gas at the operating temperature and atmospheric pressure. Most preferably, the extracting fluid is a solvent for the components of the material to be extracted.

The process of the present invention differs from the prior art processes in effecting a mass transfer to separate the dissolved material from the solids, as distinguished from the prior art processes, which are based on separation through dilution or elution. The present invention contemplates the separation of the fluids (i.e., the extracting fluid and the extracted liquids) in a single, continuous, brief operation without the addition of further extracting fluid to the system.

The present invention provides advantages over the prior art in the following particulars:

1. The present invention may be carried out in relatively simple apparatus which has few components which are easily maintained. The equipment cost is relatively low per unit volume of product processed therein. The process can be easily controlled and operated without large numbers of skilled personnel. The process readily lends inself to automatic control.

2. The process is energy efficient in that it can be operated at maximum saturation of the extracting fluid throughout the full transfer cycle. The mass transfer (or discharge cycle) is relatively short in duration as compared to prior art elution or dilution processes. The present process may be operated with a reduced quantity of extracting fluid. The mass transfer rate may be maximized for the temperatures and pressures selected for the extraction operation.

The apparatus which forms a part of this invention, which is more fully described below, is mechanically efficient. The piston which closes the extraction chamber can be radially in and out of the cylinder without the need for cumbersome manipulation of fasteners and complicated high pressure seals. Material to be processed is rapidly charged and readily removed after the extraction. The extraction process itself is rapid and can be readily automated to achieve large volume production.

In one embodiment of the process of the present invention, material to be extracted is positioned within the extraction vessel where it is contacted with a suitable quantity of the extracting fluid. The pressure on the extracting fluid in the presence of the material to be extracted is thereafter increased to the desired condition of extract solubility. When the variable volume cylinder type apparatus is used, the pressure may be increased by charging the cylinder with extracting fluid and moving the piston into the cylinder until the desired pressure is achieved. Alternatively, the desired pressure level may be achieved by pumping sufficient extracting fluid into the cylinder with an external pump to reach the desired pressure.

Thereafter, the mass transfer separation of the extracting fluid and extract (which is soluble or entrained in the extracting fluid) from the solid is effected by discharging the fluids from the cylinder at a controlled rate while the pressure within the extraction vessel is maintained. The piston is simultaneously moved into the cylinder at a controlled rate, to compensate for the volume of the fluids which are bled off, thus maintaining the pressure within the extraction vessel relatively constant and maintaining the chosen extract solubility conditions. This permits a mass transfer separation of the extracting fluid and liquid extract from the remaining solids, at high pressures, without the need to add more extracting fluid, under conditions in which the solubility of the extracted liquid in the extracting fluid is highest, thus producing extracted residue which has a greatly reduced level of extractable soluables. The most complete extraction is achieved by physically compacting the extracted solid material as the extracting fluid and extracted liquid are removed from the apparatus.

The liquid mixture of extract and extracting fluid, which is removed from the cylinder at high pressure, can be effectively and completely separated thereafter. The extracting fluid may be recycled for further extractions.

Other objectives, advantages and capabilities of the present invention will become more apparent as the description proceeds, taken in conjunction with the accompanying drawings in which:

DESCRIPTION OF THE DRAWINGS

FIG. 2 is a schematic diagram of a screw press extraction apparatus, shown in cutaway, side view.

Apparatus - FIG. 1

Figure 1:
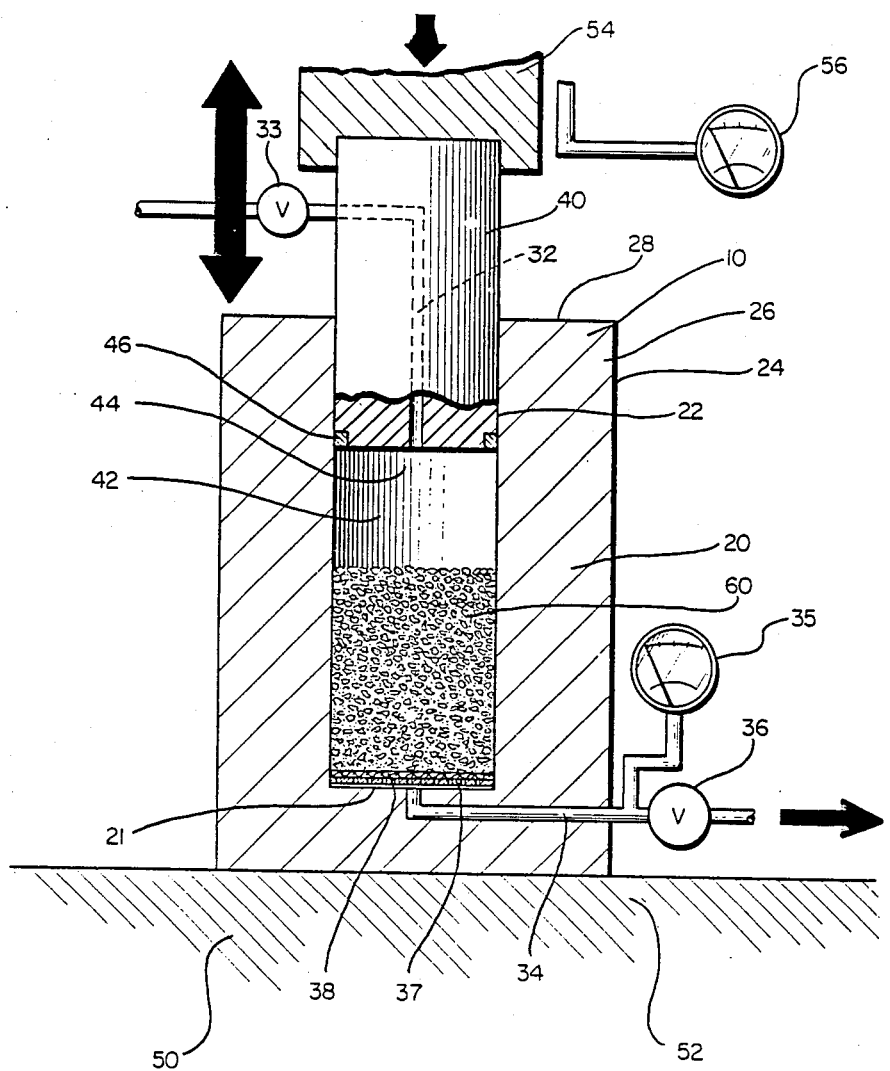
FIG. 1 is a schematic diagram of a variable volume cylinder extraction apparatus shown in cutaway side view.

Referring to FIG. 1 of the drawings, variable volume cylinder extraction apparatus of the present invention is shown generally at 10. Basically, the extractor 10 comprises thick-walled cylinder 20 within which is mounted piston 40. The extractor 10 is operationally positioned within hydraulic press 50.

The cylinder 20 generally comprises a thick-walled stainless steel vessel with a closed bottom 21 having a cylindrical inner surface 22 adapted to mate with piston 40. Piston 40 is adapted to move within the bore of cylinder 20, thereby defining the variable volume cylinder 42 which serves as the extraction vessel. Piston 40 is removable from cylinder 20 in order to allow charging of the material to be extracted 60. Preferably the shape of the bottom 21 of the cylinder apaproximates the shape of lower face 44 of piston 40, so that when the piston 40 is fully lowered, the effective volume of cylinder 42 is minimal and the material to be extracted 60 may be compacted under considerable force. The outer wall 24 of cylinder 20 defines wall 26 which is sufficiently strong to maintain the desired pressures, e.g., 15,000 psi., with an appropriate safety factor.

It is preferred that the length of cylinder 20 be sufficient to maintain piston 40 in an axial alignment with the cylinder wall 26. Similarly, piston 40 must have sufficient length to maintain the axial relationship with the inner surface 22. Seal 46 on piston 40 provides a pressure seal adequate to avoid loss of pressure in the cylinder at the operating pressures, e.g., 15,000 psi or higher. The seal may comprise an O-ring within a cup, but other forms of seals may also be used. Extracting fluid charging port 32, within piston 40, is adapted to introduce the extracting fluid axially into the cylinder 20 at the desired pressures. Extracting fluid charging port 32 is connected through valve 33 to an extracting fluid supply (not shown).

At the cylinder bottom 21, liquid discharge port 34 connects the cylinder to a recovery vessel (not shown) through discharge valve 36. Perforated plate 37 and gauze pad 38 are installed in the bottom of the cylinder above discharge port 34. The perforated plate 37 has a plurality of holes through its thickness and preferably has grooves in the bottom interconnecting the holes and discharge port 34. The perforated plate 37 and gauze pad 38 allows the extracting fluid-extract mix to be discharged over the whole area of the piston and to prevent the solid material being extracted 60 from being forced into discharge port 34. A pressure gauge 35 is connected to discharge line 34 in a manner to read on the pressure at the base 21 of cylinder 20. A similar gauze pad and perforated plate (not shown) may be used above the material to be extracted 60 and below piston 40 to distribute the extracting fluid from charging port 32 over the whole area of the piston and to avoid any blockage of charging port 32.

The hydraulic press 50 must be large enough to accommodate the variable volume cylinder 10, and strong enough to move piston 40 into the cylinder 20 to create or maintain the desired pressures and to maintain the desired pressures as the liquids are removed from the cylinder. Generally the variable volume cylinder 10 rests on and is supported by base 52 of hydraulic press 50. The piston 54 of the hydraulic press couples with the upper portion of piston 40 and is adapted to move piston 40 vertically. Gauge 56 is connected to the hydraulic system of the press and reads the force being exerted on cylinder 20 by the hydraulic press 50.

It is preferred that inner surface of cylinder 22 be smooth and free from surface blemishes, including inlet or outlet ports. Accordingly, it is preferred that the extracting fluid charging port 32 be arranged within the piston 40, and that the discharge port 34 be positioned axially, or below the piston. In this embodiment, the piston seal 46 will not encounter any discontinuous surfaces in the face of the cylinder wall.

In order to operate the apparatus of FIG. 1, the piston 40 is removed from cylinder 20 and the material to be extracted 60 is charged into the cylinder 20. Piston 40 is then placed in cylinder 20 as shown in FIG. 1 where it forms a gas-tight seal above charging port 32. It may be desirable to purge air from the cylinder using the extracting fluid in order to remove any oxygen or other gas not required or desired for the extraction process. This may be done by charging the extracting fluid through port 32 while valve 36 is open.

After any required purging has been accomplished, valve 36 is closed and the charging of the extracting fluid is continued until the desired level of extracting fluid has been charged to the cylinder through port 32.

The amount of extracting fluid charged may vary over wide limits, depending upon the nature of the fluid, the nature of the material to be extracted and the type of process to be used. The examples which follow illustrate the use of carbon dioxide to extract wheat germ wherein equal weights of gas and material to be extracted are used, as well as processes wherein the weight of the gas is several times the weight of the material to be extracted. As those skilled in the art might expect, the prcess employing greater amounts of gas provided greater yield of extract. The present invention also contemplates the use of less gas than solids, although it is generally believed the yield of extract will be diminished.

As is explained above, the desired pressure within the extraction vessel may be achieved either by charging sufficient extracting fluid to achieve the pressure without movement of the piston or, alternatively, by charging a lesser amount of extracting fluid and achieving the desired pressure by moving the piston down into the cylinder. The pressure used will be dependent upon the nature of the extracting fluid used and the material to be extracted. Pressures of about 12,000 psi are useful for extracting wheat germ and soybeans with $CO_2$. The temperature at which the process takes place may vary over wide limits, depending upon the nature of the solids, the extracting fluid and the pressure used. The temperature is selected to achieve the desired level of solubility of the extract in the extracting fluid.

In connection with the extraction of certain materials using certain extracting fluids, it may be desirable to allow an induction period wherein the material to be extracted is allowed to remain in contact with the extracting fluid at selected temperatures and pressures for a limited period of time.

After any required induction period has been contemplated, the extracted liquid and extracting fluid are then separated as a mass from the solids extracted. In the simplest case, pressure reduction valve 36 is opened slightly to slowly bleed off the mixture of extracting gas and extracted liquid from cylinder 42 through outlet 34. The downward movement of the piston 40 into cylinder 20 is continued at a coordinated rate necessary to maintain the pressure in the extraction vessel at the desired level to maintain the solubility of the extract. The downward movement of the piston is continued until the charged solids become essentially a solid mass at which time the pressure generated by the hydraulic press, as shown by gauge 56, rises with little further downward movement of the piston 40. The discharge of the fluids through discharge valve 36 can be continued, but the pressure shown at gauge 35 does not increase because at this point essentially all of the extracting fluid has been bled from the cylinder along with the extracted liquid.

The material to be extracted may be partially compacted before it is placed into the cylinder for extraction, but extensive compaction is preferably avoided. There is no general requirement for any pretreatment of the material to be extracted. In other words, seed which are whole, flaked or steamed prior to treatment may be used, but the yields may differ depending upon the seed used and the particular pretreatment.

Using the apparatus shown in FIG. 1, the material to be extracted is charged by removing piston 40 from cylinder 20. The present invention contemplates a wide variety of charging mechanisms. For instance, an open ended cylinder may be equipped with two opposed pistons which are timed to charge and discharge cakes of the material to be extracted. The use of a cylinder with two open ends provides advantages as to fabrication and maintenance. Alternatively, the cylinder may be equipped with an axial breach lock mechanism to permit the opening of the bottom of the cylinder to load the material to be extracted without the need to remove the piston from the cylinder. Breach lock mechanisms, such as are used in large guns which are secured by interrupted threads and suitable sealing mechanisms, may be used. If desired, the outlet port for the cylinder, including the necessary valving, may be built into the breach block mechanism.

The present invention is not limited to any specific ratio of piston diameter to piston stroke. Generally speaking, it is contemplated that increasing the ratio of the piston stroke to the piston diameter is advantageous for the extraction of materials containing a relatively high level of extractables.

The apparatus of FIG. 1 provides for great flexibility in carrying out the process of the present invention in that the time, temperature and pressure used to carry out the extraction for various raw materials cana be readily selected and controlled without the need to modify the equipment. The type and amount of solvent may be varied and controlled, again without the need to modify the equipment.

Apparatus - FIG. 2

The apparatus illustrated in FIG. 2 is fundamentally a screw press or screw mill or expeller type device 100 which comprises a screw 110 within barrel 120. Barrel 120 is closed at the input 122 end and at output end 124 is precision fitted with adjustable cone valve 126, which has a shape complimentary to tapered opening 128 in barrel 120. Screw 110 is driven by drive means 108. Screw mill 110 is divided into four different sections, namely sections 112, 114, 116 and 118, wherein the flights of the screw in these sections are construction to carry out different functions.

At the input end of the press 100, the screw flights in section 112 are designed to form a plug of material to be extracted. The screw flights in section 114 are designed to masticate the compressed plug while extracting fluid is injected at elevated pressure into the barrel of 120 of mill 100. The matication of the plug is essentially to achieve intimate mixing of the extracting fluid with the material to be extracted. The mastication may be achieved through the interrupted flights and/or fingers or dams or other flow restricting devices within the barrel. The objectives of section 114 is to masticate the material to be extracted in contact with the compressed extracting fluid at the desired temperature and pressure. The screw flights in section 114 transport the mixture of the extracting fluid and material ot be extracted to section 116, which provides for a controlled release of the extracting fluid-extract mixture into manifold 160 through porous sieve 162. Finally, the solids move by the screw flights in section 118, to transport the solids to output end through adjustable precision fit cone valve 126.

Material feed means 140 is designed to feed the material to be extracted to the screw press at the input end in section 112. The feed means may include feed hopper 142 and feed screw 144.

The solvent gases may be injected into the screw press using a variety of mechanisms. In the preferred embodiment, barrel 120 includes extracting fluid inlets 150, around periphery of barrel 120, which surrounds section 114 of the screw, in a manner which permits injection of the extracting fluid while maintaining the pressure at the desired levels, e.g., 12,000 psig. Fluid inlets 150 communicate with an extracting fluid supply (not shown) through manifold 152.

Alternatively, the extracting fluid may be injected into the screw press 100 through an axial opening 154 in screw 110, which communicates with inlet openings 156 in section 114 of screw 110.

Recovery zone 160 generally comprises an annular porous sieve 162, adapted to communicate fluid pressure in section 116 to pressure housing 164 through barrel 120. In this embodiment, the pressure within housing 164 is controlled to provide a suitable pressure drop between the interior of the screw press at section 116 and the recovery system so that high pressure extracting fluid-extracting mixture emerges from the screw press to recovery system 160.

After passing through recovery zone 116, the extracted solids are transported through zone 118 to opening 124, at which time they are discharged from barrel 120 through adjustable precision fit cone valve 126, thus emerging as a compacted solid at atmospheric pressure.

In operation, the material feed hopper 142 may be filled with soybeam flakes or a similar material to be extracted. Feed screw 144 forces the soybean flakes under pressure into the screw press at section 112 where a plug of material to be extracted is formed. In section 112, the flights of screw 110 are adjacent to the inner surface of barrel 120. The screw is turned at a rate which causes compaction of the input flakes sufficiently to withstand the desired operating pressures of the extraction, and prevent any blow back of high pressure extracting fluid. The compacted flakes are then transported to section 114. At this point, the flights of screw 110 do not create any further compaction or any increase in pressure, but permit the extracting fluid from inlets 150 and/or 156 to contact and mix with the compacted material to be extracted. The material to be extracted is thus mixed with the extracting fluid while the mixture is transported from section 114 into section 116.

Within section 116 the flights of screw 110 are separated from porous media 162 in order to build up a slight cake of solids which function as a filter which helps to avoid the extrusion of solids into the porous media 162. The porous media 162, however, permits the fluid materials to bleed through from the section 116 to recovery area 160. As this happens, the solids are progressively transported from section 116 to section 118. No further compaction is required in section 118. The extracted material is transported to the adjustable cone valve solids outlet 126 for discharge and recovery. The internal system pressure will assist the transport of solids to and through the precision cone valve 126.

The Extracting Fluid

In carrying out the invention, a wide variety of extracting fluids may be used. Although most of the examples herein below illustrate the use of carbon dioxide to extract lipid oils from seed vegetables, the present invention is not limited to any specific extracting fluid.

Generally it is preferred to use an extracting fluid which is normally gaseous. However, one may also use fluids which are liquid at normal conditions, but which are gaseous at the extraction temperature and at atmospheric pressure. Extracting fluids which are gaseous provide enhanced mass transfer separation of the extracted liquid from the extracted solids. Gaseous extracting fluids may be readily separated from extracted liquids, which provides obvious advantages.

It is most preferred to employ as the extracting fluid a substance which is gaseous at operating temperature and atmospheric pressure and which under the conditions of the extraction, functions as a solvent for the extract or some portion of the extract. As is illustrated by the examples, at least under some conditions, extracting fluids having solvent properties provide higher extract yields. However, as is demonstrated by Example 4, below, non-solvent gases such as nitrogen are effective and may be desirable in that they do not produce the pronounced refrigeration effect produced by carbon dioxide and some other solvent type gases. Other useful gases include nitrogen, nitrous oxide, freons, low molecular weight hydrocarbons such as ethane or propane and mixtures thereof. The present invention contemplates the use of hexane, isopropanol, propylene glycol and other solvent-type materials as the extracting fluid. Liquid solvents may be employed for some purposes either alone or with gaseous extracting fluids. Mixtures of extracting fluids and multiple or sequential extractions using different extracting fluids are also contemplated.

In one embodiment, a supercritical fluid, such as carbon dioxide, is used under conditions which cause liquefication. It is preferred to use the carbon dioxide at temperatures and pressures which provide for supercritical conditions, i.e., above 31.1° C. and above 73.8 bar. If gases other than carbon dioxide are used, the ranges with respect to the temperatures and pressures outlined hereinafter in the specification can be obtained from data described in handbooks of physical chemistry.

The present invention also contemplates mixing the material to be extracted with the extracting fluid before the material to be extracted is charged to the extraction vessel. For example, carbon dioxide, in the form of dry ice, may be premixed with the oil seeds and the mixture of dry ice with the oil seeds thereafter charged to the extraction vessel. It is contemplated that the addition of solid dry ice particles to oil seeds prior to passing the oil seeds through a conventional screw press in a deoiling process would enhance the recovery of oil from such a process.

Extracting Temperature

A wide variety of temperatures may be employed in operating the equipment of the apparatus of the present invention. Although the examples which follow illustrate the use of temperatures in the 40°-100° C. range to extract oil seeds, higher temperatures may be preferable in that the extracting fluids are more mobile even though they may be somewhat less effective as solvents at higher temperatures. Such factors as the moisture in the material to be extracted can vary the optimum conditions for carrying out the extraction.

The present invention also contemplates the use of much higher temperatures, e.g., 500° C., wherein the apparatus functions as a chemical autoclave. It is postulated that selected reactions could be carried out in a shorter reaction time, with less solvents and increased yield.

Extracting Pressure

Although the examples which follow illustrate the use of 12,000 pounds per square inch pressure within the extraction vessel on oil seeds, the present invention is not so limited. A wide variety of pressures, extracting fluids and operating temperatures and pressures may be used. The present invention further contemplates the extraction using variable pressures during the extraction process.

It is considered essential to maintain the pressure in the extraction vessel, while the extracting fluid-extract mixture is separated from the extracted solids and discharged from the extraction vessel. The pressure in the extraction vessel, however, need not be the maximum pressure of the extraction, nor is it necessary to maintain a uniform pressure in the extraction vessel throughout the separation. For certain materials, it may be desirable to permit a dwell time wherein the extracting fluid is maintained under pressure in contact with the material to be extracted.

Compaction

A preferred embodiment of the present invention contemplates the compaction or physical crushing of the material to be extracted in order to expel the maximum amount of extract. The compaction functions to enhance the mass transfer separation of the extracting fluid and the extracted liquid from the solid residue. In the case of seed vegetables, it is postulated that the compaction will rupture cells and thus enhance the availability of the oil in the cells. Tests have shown that using the apparatus of FIG. 1 that an extraction without compaction will produce a cake with as mush as 3% retained oil, while an extraction run under generally the same conditions, but with compaction, will produce a cake with less than 1% of retained oil.

It has been found that using the variable volume cylinder described above and shown in FIG. 1, that better yields of the extracted liquids are achieved by charging sufficient material to be extracted into the cylinder to form a cake of some depth, e.g., one inch thick, after compaction. It is postulated that a thick cake is less prone to channeling of the extracting fluid than a relatively thin cake.

Recovery of Extract

The oil which is bled off through the discharge valve along with the liquefied carbon dioxide may be recovered simply by allowing the carbon dioxide to volitalize.

Alternatively, the carbon dioxide-oil mixtures removed from the variable volume cylinder may be retained under reduced, but substantial pressures, e.g., 1,500 psi. Under such conditions, the solubility of the oil in the carbon dioxide is significantly reduced and the recovery of the oil from the gas may be accomplished without volatilizing the gas. The carbon dioxide may be retained at elevated pressure, e.g., 1,500 psi, for recycling through the extraction vessel.

Materials Extracted

The process and apparatus of the present invention may be applied to extract of a wide variety of liquids from a wide variety of solid materials. Although the word "liquid" has been and hereinto define the "extract" of the extraction process, the process of the present invention may be used to separate solid extracts, such as waxy materials, or solids which are soluble in the extracting fluid from the solid material being extracted. The present invention also contemplates the extraction of liquids from other liquids or semi-solid materials.

As is illustrated by the examples, the present invention may be adapted to extract a wide variety of liquids from organic matter, including the extraction of oils from wheat germ and soybeans. The present invention also contemplates extracting caffine from coffee or tea, hops extraction, the extraction of residual oils from various substances including petroleum products from oil shale or tar sands. It is further contemplated that the processes and products of the present invention may be used to recover diluted solvents from water, diesel oil from drilling muds and other compounds, to regenerated activated carbon and other adsorbants which are contaminated with organics, coal liquefication or extraction, removal of impurities from polymer melts, separating waxes and resins from residual oil, delignification and pulping of wood, oxidation of hazardous wastes and deashing synthetic fuels.

The process and apparatus of the present invention may be used to extract colors, flavors, essences and medicinal products, such as drugs, from such natrual products as roots, bark, leaves, flowers, and seeds. For example, colors may be extracted from annato, turmeric and cochineal; oleoresins may be extracted from roots and the like. Similarly, animal based products, such as glands, liver, pancreas and spinal cord may be extracted. The present invention also may be used to produce marine source products, such as separation and concentraction of selected fatty acids from marine lipids.

The process and apparatus of the present invention is particularly useful in carrying out the extraction of oil from seed vegetables as is described in U.S. Pat. No. 4,493,854 to Friedrich and Eldridge, the extraction of lipids from lipid containing materials as described in U.S. Pat. No. 4,466,923 to Friedrich, and the production of food grain corn germ as described in U.S. Pat. No. 4,495,03 to Christianson and Friedrich, in extracting coffee oil from roasted coffee as described in U.S. Pat. No. 4,328,255 to Roselius, Vitzthum and Hurbert, and in fractionating butterfat as described in U.S. Pat. No. 4,504,503 to Biernoth et al.

The following examples will serve to illustrate the process of the present invention and the apparatus thereof in extracting several oil seeds, but it is understood that these examples are set forth for illustration and many other products may be extracted using suitable variations. Examples 1, 6 and 12 do not illustrate the present invention, but are set forth for comparative purposes.

All examples were conducted in an apparatus similara to that depicted by FIG. 1.

EXAMPLE 1

The cylinder had an outside diameter of 5 inches and was $11\frac{3}{4}$ inches high with a central bore $2\frac{1}{4}$ inches in diameter and $9\frac{3}{8}$ inches long. The piston was 10 inches in length and $2\frac{1}{4}$ inches in diameter, which gave it an effective area of 3.96 square inches. The effective stroke of the piston was about 5 inches.

A wad of gauze 38 was placed at the bottom of the cylinder above perforated plate 37. The cylinder was charged with 100 grams of full-fat wheat germ meal containing about 10.5% fat. A wad of gauze was placed over the charge of wheat germ mean and a perforated plate was placed on top of the gauze. Valve 36 was opened to permit the escape of any gases in the system. Valve 33 was closed throughout the experiment.

The piston was inserted in the cylinder and hand closed. The uncompressed cake was about 4 inches high. The cylinder was maintained at a temperature of about 90°–95° C. throughout the experiment. The hydraulic press was engaged and the piston moved downwardly 2.75, at which time gauge 56 showed a reading of 30 tons, which is approximately 15,000 psi pressing on the cake in the cylinder. The cake was about 1.25 inches thick and had a specific gravity of 1.1. No oil was discharged from the apparatus during this experiment, although traces of oil could be seen on the gauze.

EXAMPLE 2

Using the apparatus described in Example 1, 100 grams of full-fat wheat germ meal were placed in the cylinder. Cotton gauze and a perforated plate were placed on top, according to the procedure of Example 1. The cylinder was maintained at 90°–93° C. Valve 36 was closed and carbon dioxide was charged to the system through valve 33 to a pressure in the cylinder of 1,100 psi. This charged about 100 grams of $CO_2$ into the cylinder. When the charging had been accomplished, gauge 56 read about 2 tons which is equivalent to 1,000 psi in the cylinder. Valve 33 was closed and piston 40 was lowered until gauge 35 showed the gas pressure within the cylinder was 12,000 psi. At this point, valve 36 was opened to permit the discharge of a mixture of $CO_2$ gas and wheat germ oil, while the piston was lowered to hold the pressure at 12,000 psi.

About 7 grams of a very cold, thick oil emerged from valve 36 during a 30–40 second interval. The operation of the hydraulic press was continued until the force shown by gauge 56 began to rise above 24 tons, which was equivalent to 12,000 psi within the extraction cylinder, without any increase in the gas pressure shown by gauge 35.

The resulting compressed cake was smaller than the cake produced in Example 1 and had a lighter color. The cake had about 4% retained oil which indicates about 60% of the original oil was removed.

EXAMPLE 3

Using the equipment and procedure of Example 1, 100 grams of wheat germ was placed in the cylinder and $CO_2$ gas was charged continuously until about 12,000 psi was reached. This provided a ratio of 3 parts of gas by weight for each part of meal.

A few seconds after the operating pressure of 12,000 psi was reached, the carbon dioxide-wheat germ oil was bled off through valve 36 while maintaining the pressure with a hydraulic press. Again, the pressure was maintained on the cake until all of the $CO_2$ and dissolved wheat germ oil had been discharged. The resulting cake contained 1.1% oil (based on an ether extract).

Similar to Example 2, continued pressure on the cake with the hydraulic press did not discharge any additional oil.

EXAMPLE 4

Using an apparatus described in Example 2, the cylinder was charged with 100 grams of full-fat wheat germ mean and pressurized with nitrogen gas to 2,500 psi. The piston was lowered using the hydraulic press to achieve 12,000 psi whereupon valve 36 was opened to discharge the nitrogen gas and entrained oil. As the nitrogen was removed, a quantity of oil was recovered.

The piston was raised and the cylinder was again charged with 2,500 psi of nitrogen (at 92° C.). Again, the piston was lowered to achieve 12,000 psi and the nitrogen-entrained gas was discharged through valve 36. An additional quantity of oil was recovered leaving a residual fat of about 5% in the cake (based on ether extract).

The cake had a similar appearance to the cake in Example 2. The use of nitrogen gas, as illustrated in Example 4, was found advantageous in that nitrogen does not demonstrate a pronounced refrigeration effect. Thus, problems with freeze up of valves and plugging of lines are largely avoided through the use of nitrogen.

EXAMPLE 5

A variable volume cylinder similar to that shown in FIG. 1 was used, but the cylinder had a gas injection port through the sidewall of the cylinder near the top of the cylinder.

The cylinder was charged with 40 grams of full-fat, raw soybean flakes. The piston was put in place to form a gas tight seal above the gas injection port. The cylinder was flushed with carbon dioxide to thoroughly purge any air. Valve 36 was then closed.

The temperature of the cylinder was heated to 52°. The heaters were turned off and $CO_2$ at 1,300 psi was applied to the cylinder until the flow stopped. Approximately 2 parts by weight of $CO_2$ were used for each part by weight of soy flakes. The gas charging valve 33 was closed and the piston was gradually lowered using the hydraulic press. At the beginning of the downstroke, the piston was 5 inches from the bottom of the cylinder. When the piston was 1.75 inches from the bottom, the pressure in the cylinder was 12,000 psi. At this point the pressure release valve was opened to bleed the $CO_2$-soybean oil off at a rate sufficient to maintain the pressure at 12,000 psi, while the piston was continuously lowered. When the piston was to 0.75 inches above the bottom, essentially all of the gas had been removed from the cylinder and the pressure on the hydraulic press rose to 30 tons without any further increase to extraction fluid pressure within the extraction vessel.

The piston was removed and the soybean flake residue recovered. The process, which consumed approximatey 5 minutes, reduced the oil content of the soybean flakes from 17.6% to 3.7%, as determined by ether extraction.

The approximate dynamics of Example 5 are shown in Table I below.

TABLE I

| Trial Minutes | Piston-Inches From Bottom | Press Pressure Tons | Cylinder Pressure |
|---|---|---|---|
| 0 | 5 | 3 | 1,300 psi |
| 0.2 | 4 | 4 | 1,400 psi |
| 0.4 | 3 | 5 | 1,500 psi |
| 0.6 | 2.5 | 10 | 1,700 psi |
| 0.8 | 2 | 18 | 4,000 psi |
| 1.0 | 1.75 | 24 | 12,000 psi |
| 3.0 | 1.25 | 24 | 12,000 psi |
| 5.0 | 0.75 | 30 | 12,000 psi |

EXAMPLE 6

The apparatus of Example 5 was charged with 100 grams of full fat, soy flakes, which included the hulls of the beans. The soy contained approximately 17% fat and 12% moisture. The soy flakes filled occupied the lower 3 inches of the cylinder.

The piston was inserted and the cylinder was purged with carbon dioxide. After purging, valve 36 was closed and the cylinder charged to 1,500 psi with $CO_2$. Using an external pump, additional $CO_2$ was pumped into the cylinder until the pressure reached 12,000 psi. This provided 3 parts by weight of $CO_2$ for every one part by weight of soybean meal. The flakes were permitted to soak in the pressurized $CO_2$ for 20 minutes.

The temperature of the cylinder was heated to 51° C. and the pressure release valve was opened to bleed off the $CO_2$-soybean oil at the bottom of the cylinder while additional $CO_2$ was pumped into the top of the cylinder at a rate sufficient to maintain the pressure at 12,000 psi.

The pumping of the $CO_2$ at 12,000 psi was continued until 30 parts by weight of gas for each part by weight of soybean flakes had been passed through the soybean flakes. The $CO_2$ initially emerging from the cylinder was saturated with soybean oil, but as the process continued the amount of soybean oil in the gas declined. The piston was not lowered during this test. The $CO_2$ emerging at the end of the process contained essentially no oil. Analysis of the cake showed that it contained 2.62% retained oil (based on an ether extraction).

EXAMPLE 7

Using the apparatus described in Example 1, the cylinder was again loaded with 100 grams of full-fat soy flakes described in Example 6. The cylinder was purged using $CO_2$, after which the cylinder was charged to 1,500 psi using $CO_2$. An external pump was used to increase the $CO_2$ pressure to 12,000 psi which gave a weight ratio of 3 to 1 gas to meal. This again was allowed to soak for 20 minutes at 65° C.

After the soaking, the pressure release valve was opened to start to bleed out the $CO_2$-soybean oil mixture while the piston was lowered to maintain the pressure at 12,000 psi. The process continued until the cake was compressed from the initial 3 inches to 1 inch.

The resulting cake contained 2.39% retained fat (based on an ether extract) and a moisture of about 13.42%. This indicates little, if any, moisture was extracted, but only one-tenth the amount of gas was used as compared to Example 6.

EXAMPLE 8

Using the apparatus described in Example 1, 100 grams of soybean flakes, as described in Example 6, were charged into the cylinder.

The cylinder was purged with nitrogen at 2,800 psi and then the purge valve was closed and the nitrogen was charged to 2,800 psi. An external pump was used to pump additional nitrogen into the cylinder until the pressure reached 12,000 psi.

This was allowed to soak for 20 minutes at a temperature of 55°–63° C. The pressure release valve was opened to allow the nitrogen-soybean oil to bleed out of the cylinder while the piston was lowered to maintain the pressure at 12,000 psi. No refrigeration affects were noticed by the release of the nitrogen. No oil was noted in the initial discharge of the nitrogen, while the ram was closed from 5 inches to about 2 inches. However, during the last 1 inch stroke of the piston, a great volume of oil was released with the nitrogen.

Analysis of the soybean flake cake retained in the cylinder showed 2.36% retained oil with a moisture content of 13.07%.

The soybean meal recovered from the cylinder has a specific gravity of about 1.1 which is approximately the same as the specific gravity of $CO_2$ at 12,000 psi.

EXAMPLE 9

An extraction procedure was carried out in the same manner as in Example 8, except that Argon gas was used in place of nitrogen. The retained soybean cake contained 9.61% retained fat and a moisture of 13.37%. This indicates Argon did not have the same affect as nitrogen with respect to the extraction of oil from soybean flakes.

EXAMPLE 10

The apparatus of Example 1 was charged with 33 grams of raw wheat germ meal. The meal contained approximately 9% by weight of fat and about 13% by weight of moisture.

Using the procedure of Example 7, the cylinder was purged with 1,500 psi $CO_2$. The purge valve was closed and the $CO_2$ was admitted until 1,500 psi was reached. $CO_2$ was then continuously added by an external pump until 12,000 psi was reached. This provided 11 parts by weight of gas to each part by weight of meal. The temperature was maintained at 66° C.

After a dwell time of about 1.5 minutes, the discharge valve was opened and the piston was lowered to hold the pressure at 12,000 psi.

The discharge of the $CO_2$-oil required about $3\frac{1}{2}$ minutes to complete. The wheat germ cake was recovered and analyzed to show it retained about 0.74% of the fat (based on ether extract).

EXAMPLE 11

The apparatus of Example 1 was charged with 100 grams of wheat germ meal in the manner of Example 10. The cylinder was pressurized with $CO_2$ to 12,000 psi. The pressure release valve was opened and the $CO_2$ gas with the entrained wheat germ oil was allowed to bleed off until the pressure in the cylinder reached 4,000 psi. This required about 24 seconds. The piston was then lowered, maintaining the pressure at 4,000 psi.

The wheat germ cake was recovered and analyzed. It contained 1.94% of retained fat.

EXAMPLE 12

Another extraction was run in the manner of Example 10, wherein 33 grams of wheat germ were charged into the cylinder which was then charged to 12,000 psi with carbon dioxide. This gave a ratio of 11 parts of gas by weight to 1 part of wheat germ by weight. After soaking for 5 minutes, the $CO_2$ was allowed to bleed off while maintaining the temperature at 46° C. The bleeding was allowed to reduce the cylinder to 1,500 psi. Thereafter, the cake was flushed with $CO_2$ for 5 minutes using 1,500 psi $CO_2$.

The cake was recovered. Analysis indicated the cake had 6.19% retained fat.

EXAMPLES 13–16

Examples 13 through 16 were carried out in apparatus illustrated by FIG. 1 and described in Example 1. In each case, 100 grams of wheat germ containing 10.5% fat was placed in the cylinder and moistened with the co-solvent shown in Table II below. In Examples 13 through 15, carbon dioxide was then charged to 950 psi and the piston was lowered to achieve a pressure of 4,000 psi. Mass transfer separation of the $CO_2$, co-solvent, and dissolved oil from the solids was carried out at 4,000 psi. The retained fat of the solids cake is also shown.

In Example 16 no carbon dioxide was used, but the cake was compacted to 12,000 psi in the presence of the isopropanol.

It is estimated that the extraction of wheat germ using the above amounts of isopropanol or hexane without carbon dioxide and without high pressure would produce a cake having 6–8% retained fat.

The results of Examples 13 through 17 are shown in Table II.

TABLE II

| | example | | | |
|---|---|---|---|---|
| | 13 | 14 | 15 | 16 |
| Wheat Germ-g | 100 | 100 | 100 | 100 |
| Co-Solvent | Isopropanol | Hexane | Isopropanol | Isopropanol |
| Co-Solvent Amt. | 50 ml | 50 ml | 25 ml | 50 ml |
| $CO_2$ Charge | 950 psi | 950 psi | 950 psi | None |
| $CO_2$ Pressure | 4,000 psi | 4,000 psi | 4,000 psi | None |
| Compaction | 4,000 psi | 4,000 psi | 4,000 psi | 12,000 psi |
| Retained Fat % | 1.26 | 1.76 | 2.56 | 2.98 |

EXAMPLE 17

The apparatus described in Example 1 was charged with 100 grams of crushed, whole rapeseed, including some hull fragments. The charged solids contained 42.6% oil, by weight.

Carbon dioxide was charged to the system to 11,000 psi at a temperature of 55° C. This gave a ratio of 3 parts by weight of carbon dioxide for each part by weight of seed. Following the procedure of Example 3, the piston was lowered and the carbon dioxide-rapeseed oil mixture was discharged. The rapeseed oil was recovered.

The resulting cake, in two similar experiments, contained 7.57% and 9.86% retained oil by weight, based on ether extract. This indicates that about 85% to 90% of the oil was extracted from the seed.

The scope of the invention herein shown and described is to be considered only as illustrative. It will be apparent to those skilled in the art numerous modifications may be made therein without departure from the spirit of the invention or the scope of the appended claims.

I claim:

1. A method of extracting soluble materials from seed vegetables which comprises:
   contacting a seed vegetable to be extracted with a selected quantity of $CO_2$ at a selected elevated pressure within a defined space;
   forming a fluid mixture of $CO_2$ and dissolved soluble seed vegetables in said defined space;
   discharging said fluid mixture as a mass from said defined space;
   mechanically maintaining said pressure in said defined space as said fluid mixture is discharged by simultaneously reducing the volume of said defined space at a rate sufficient to maintain the pressure as fluid mixture is removed from said defined space; and
   compacting said seed vegetable as the volume of said defined space is reduced.

2. A method as described in claim 1, wherein said selected pressure is achieved by charging said selected quantity of $CO_2$ into said defined space and thereafter reducing the volume of said defined space to achieve the selected pressure.

3. A method as described in claim 1, wherein said fluid mixture is discharged from said defined space without adding $CO_2$ during the discharge step.

4. A method as described in claim 1, wherein the pressure in the discharging step is at least as high as the pressure in the contacting step.

5. A method as described in claim 1, comprising the additional steps of separating $CO_2$ from the fluid mixture, recovering said extracted liquid and recycling the separated $CO_2$.

6. A method as described in claim 1, wherein the seed is soybean.

7. A method as described in claim 1, wherein the seed is wheat germ.

8. A method as described in claim 1, wherein the seed is rapeseed.

9. A method as described in claim 1, wherein said $CO_2$ extracting fluid is mixed with a liquid solvent.

* * * * *